(12) United States Patent
Mahmoud

(10) Patent No.: US 8,898,012 B2
(45) Date of Patent: Nov. 25, 2014

(54) QIBLA ORIENTATION DEVICE

(71) Applicant: King Fahd University of Petroleum and Minerals, Dhahran (SA)

(72) Inventor: Tarek Haissam Mahmoud, Jeddah (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 12 days.

(21) Appl. No.: 13/846,823

(22) Filed: Mar. 18, 2013

(65) Prior Publication Data

US 2014/0278079 A1    Sep. 18, 2014

(51) Int. Cl.
*G01C 21/00* (2006.01)

(52) U.S. Cl.
CPC ...................................... *G01C 21/00* (2013.01)
USPC .......................................... 701/491; 701/408

(58) Field of Classification Search
USPC ........ 701/491, 408, 454; 340/995.1; 434/245; 368/47
See application file for complete search history.

(56) References Cited

U.S. PATENT DOCUMENTS

| 4,372,052 | A | 2/1983 | Wakim |
| 5,790,477 | A | 8/1998 | Hauke |
| 8,086,490 | B2 * | 12/2011 | Zampini et al. ............. 705/14.4 |
| 8,210,710 | B2 | 7/2012 | Koch et al. |
| 8,462,490 | B2 * | 6/2013 | Shin et al. ................ 361/679.01 |
| 2003/0148772 | A1 | 8/2003 | Ben-Ari |
| 2003/0148776 | A1 | 8/2003 | Ciechanowiecki et al. |
| 2005/0004752 | A1 | 1/2005 | Choi et al. |
| 2005/0237859 | A1 * | 10/2005 | Jibrin .............................. 368/47 |
| 2005/0288858 | A1 | 12/2005 | Amer et al. |
| 2007/0077940 | A1 | 4/2007 | Mamo |
| 2009/0087825 | A1 | 4/2009 | Govindswamy et al. |
| 2010/0201720 | A1 * | 8/2010 | Zampini et al. ............... 345/690 |

FOREIGN PATENT DOCUMENTS

GB          2430258          3/2007

* cited by examiner

*Primary Examiner* — Marthe Marc-Coleman
(74) *Attorney, Agent, or Firm* — Richard C. Litman

(57) ABSTRACT

The Qibla orientation device is a small, hands-free device enabling a user of the device to determine Qibla, or the proper orientation to face the Kaaba in Mecca. The device contains a GPS receiver, magnetic direction sensor, directional indicator lights, audio directional output, and a longitudinally aligned laser projector. The device determines its position on the surface of the earth by the GPS receiver, and its orientation toward the Kaaba according to the location determined and the magnetic direction sensor. Directional lights are provided to orient the user to the left or right for alignment. Audio output is also provided for the visually handicapped. The laser may be activated to project a laser line aligned with the longitudinal axis of the device for determining orientation during initial construction of a mosque or other structure.

9 Claims, 5 Drawing Sheets

QIBLA ORIENTATION DEVICE

BACKGROUND OF THE INVENTION

1. Field of the Invention

The present invention relates generally to electronic navigation devices, and particularly to a hands-free Qibla orientation device for orienting the user in the direction that should be faced during salah (formal worship), generally fixed as the direction of the Kaaba in Mecca.

2. Description of the Related Art

It is considered important in many religions to face in a certain direction during prayer and/or at other specific times or intervals. An example of this practice is found in the Muslim religion, wherein practitioners are required to face in the direction of Mecca (Makkah), or more specifically, toward the Kaaba in Mecca, during prayer. This is considered of such importance that a great deal of attention is given the proper direction or orientation for prayer. In fact, the Arabic language has a specific word, "Qibla," referring to the alignment of an individual with the direction of Mecca or the Kaaba.

As can be imagined, it can sometimes be difficult to determine the proper orientation. While a Muslim may know the local area and orientation, it may be difficult to determine the proper orientation when one travels to an unfamiliar area and, for whatever reason, cannot orient himself or herself relative to the sun, known landmarks, or other features. While the simple magnetic compass may be of some value for such orientation, it is by no means a universal solution due to local electromagnetic fields, local ferromagnetic deposits, adjacent steel structures, etc. Moreover, most practitioners of the Muslim faith desire greater accuracy than can be achieved with such relatively simple devices. Furthermore, it is of utmost importance for Muslims to pray in congregation, i.e., for two or more persons to pray together at the same time. When such a congregation is achieved, a leader (Imam) leads the prayer by standing at the front, while the remaining congregation forms straight lines behind him. The Imam at the front and every one of the people participating in the prayer behind him must face Qibla.

Accordingly, a number of electronic devices have been developed in the past for the purpose of orienting oneself toward Mecca and/or Kaaba. However, generally speaking, these devices only point in the direction of Mecca, or perhaps the Kaaba, and do nothing to assure that the individual is also oriented in the proper direction. While a few such devices have been developed, they generally do not provide for the actual directional orientation of the device in a specific direction. For example, GPS receivers have been developed for orienting oneself while hiking, hunting, and/or engaging in other outdoor activities. Many cell phones also now include GPS receivers as well. However, these devices generally only pinpoint the location of the device, and do not provide orientation from their location toward another distant location. Where such orientation is provided by the device, the annunciator system is still generally rather limited. For example, some such devices provide a visual signal for orientation, but such a visual signal is not of much help to the visually handicapped.

Thus, a Qibla orientation device solving the aforementioned problems is desired.

SUMMARY OF THE INVENTION

The Qibla orientation device comprises a small hands-free electronic device enabling a user not only to determine the direction of Mecca and the Kaaba, but also to orient himself or herself in the proper direction, a direction known as "Qibla" in the Arabic language. The device includes a GPS receiver, and also includes the geographic coordinates for the Kaaba in Mecca to facilitate operation by a user of the device without the need for the user to input geographical coordinates or other information. The device further includes a visual display to enable the user to align himself so that he is accurately facing Mecca and the Kaaba. In order to achieve that, the device includes selectively activated audiovisual signals that vary depending upon the orientation of the device, thus enabling him to achieve Qibla. The audiovisual signals are especially helpful for the visually handicapped and/or the hearing impaired to use the device to achieve Qibla as well.

The Qibla orientation device provides these functions by means of a GPS receiver that communicates with a preprogrammed central processing unit (CPU). The device also includes a digital magnetic compass that is compensated for magnetic dip, i.e., the angle of the lines of magnetic force relative to the horizontal. A line laser selectively projects from the bottom of the device to form a longitudinal visual line from the device for the visual orientation of the congregation line, as described above.

The Qibla orientation device may be suspended from the neck or may be installed atop a tripod or other suitable support, as desired. The device is turned on, and the GPS unit determines the location of the device on the surface of the earth. The digital magnetic compass determines the orientation of the device necessary to align with Mecca and the Kaaba, and communicates with the CPU accordingly. The CPU then actuates the visual and/or audio signals to alert the user as to the orientation of the device relative to Mecca and the Kaaba. The user hangs the device freely from his neck directly in front of him or her, and turns his or her body with the Qibla orientation device to achieve Qibla according to the output of the visual or audio signals. The laser may also be activated as desired to project a visible line perpendicular to the line of Qibla. However, the laser system will preferably not emit light until the device is actually properly aligned. The laser system can be helpful in congregation prayer, as noted above. The laser system can also be helpful in setting proper alignments in the initial construction of a mosque.

These and other features of the present invention will become readily apparent upon further review of the following specification and drawings.

DETAILED DESCRIPTION OF THE PREFERRED EMBODIMENTS

Figure 1:
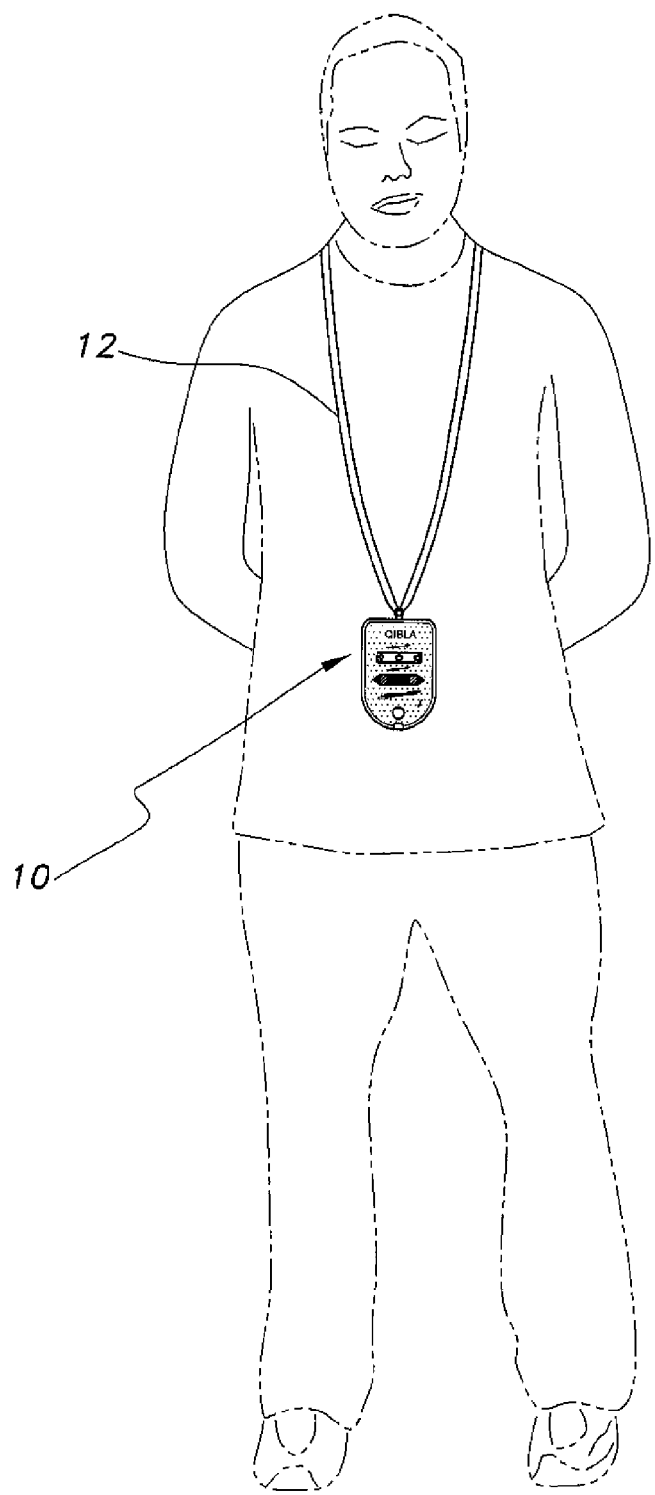
FIG. 1 is an environmental, perspective view of a person using the Qibla orientation device according to the present invention.

The Qibla orientation device comprises a small device adapted to be suspended from the neck of the user. The device contains a number of different electronic components for determining Qibla, i.e., for orienting the user of the device in the proper direction to face Mecca, or more precisely, the Kaaba in Mecca. FIG. 1 provides an environmental perspective view of the Qibla orientation device 10 suspended from the neck of a user of the device by a lanyard 12, for determining Qibla. The case 14 includes a lanyard attachment eye 16 extending from the top portion 18 thereof, as shown in FIG. 2 of the drawings.

Figure 2:
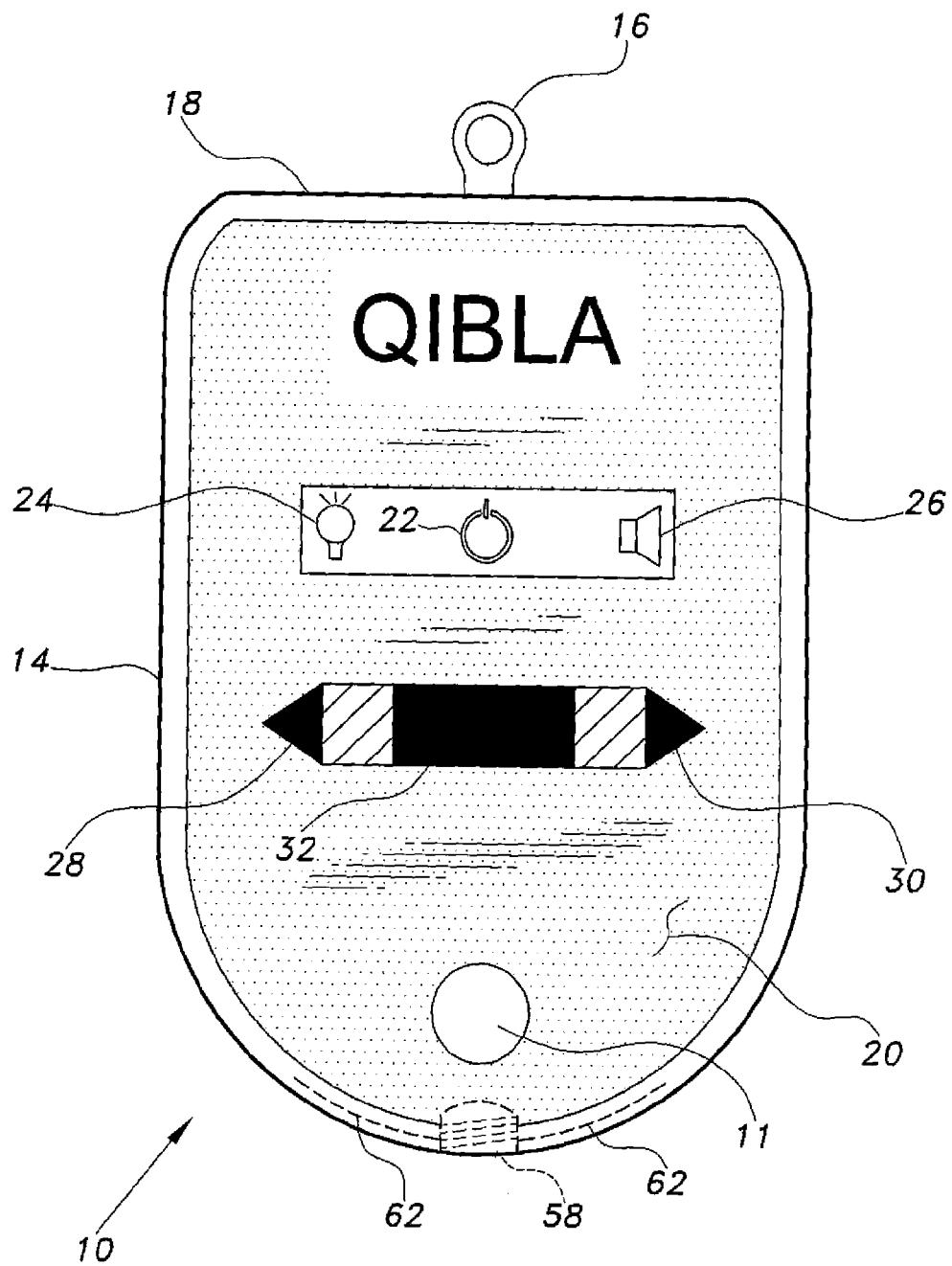
FIG. 2 is a detailed front elevation view of the Qibla orientation device according to the present invention, illustrating various features thereof.

FIG. 2 also shows the front surface 20 of the case 14, which has controls and turn indicator lights thereon. The forward portion of the panel includes an on/off switch 22, a visual signal control 24, and an audio output control 26. The front portion of the panel includes three directional indicator lights therein. A right turn indicator light 28 is to the left, a left turn indicator light 30 is to the right, and an alignment indicator light 32 is located between the right and left turn lights 28 and 30. The operation of these lights is explained further below. The front surface 20 also includes a laser on/off button 11.

Figure 3:
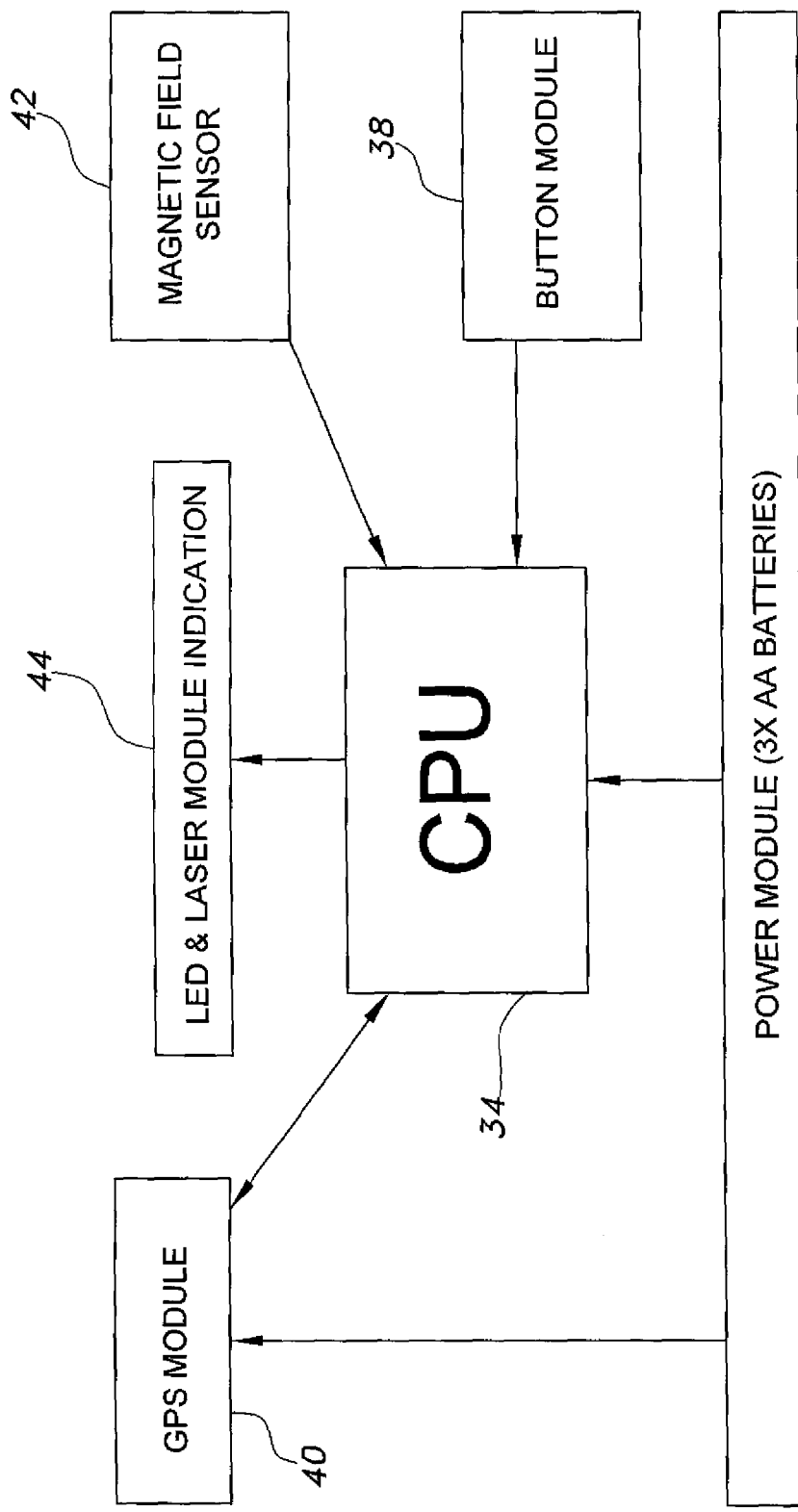
FIG. 3 is a block diagram of the components of the Qibla orientation device according to the present invention.

FIG. 3 is a block diagram of the electronic components of the Qibla orientation device 10. The heart of the system is the central processing unit or CPU 34. The CPU 34 receives electrical power from a power module 36 containing electrical storage cells, e.g., AA batteries. The CPU 34 receives input from the button module 38, i.e., the forward panel with its on/off switch 22, visual signal control 24, and audio output control 26. The CPU 34 also receives input from the GPS module 40 and the magnetic field sensor 42, to determine the proper orientation for Qibla. The magnetic field sensor 42 is a digital electronic compass having compensation for magnetic tilt, i.e., the angle of the magnetic lines of force from the horizontal as one travels north or south from the magnetic equator. Finally, the CPU 34 communicates with the LED and laser module indicators 44 (i.e., the various LED indicator lights 28 through 32 and a laser, shown in FIG. 6 and discussed further below) in order to display the appropriate visual displays. (The CPU 34 also controls the audio output 26, and the magnetic field sensor 42 communicates with the audio output 26 through the CPU 34.)

Once the device 10 is turned on, the GPS 40 determines its location on the surface of the earth, as is conventional using GPS technology. In the event that GPS signals to the GPS receiver are blocked, e.g., the user is within an enclosed structure, the CPU 34 uses the last known GPS location, which is automatically stored each time the GPS is activated. This data is sent to the CPU 34, which is preferably preprogrammed with the geographical coordinates for Mecca, and more specifically for the Kaaba in Mecca, permanently stored therein. The CPU 34 then compares the location provided by the GPS module 40 with the known location of the Kaaba, and determines the direction from the present location of the device 10 to the Kaaba. (The distance may be computed as well, but the distance is not necessary to the determination of Qibla.)

At this point, the direction toward Mecca and the Kaaba is known, but the device 10 may not be oriented in that direction. Accordingly, the CPU 34 receives directional input from the magnetic field sensor 42, and is then able to provide appropriate signals to the LED 44 to indicate the proper direction to turn to face Mecca. If the angle between the present orientation of the device 10 and the proper direction toward Mecca is relatively large, e.g., to the right, then the right turn LED indicator light 28 will illuminate intermittently to indicate that the user must turn the device 10 (and hence oneself, as the device is freely suspended from the neck of the user) to the right. Similarly, if the angle between the present orientation of the device 10 and the proper direction toward Mecca is relatively large, e.g., to the left, then the left turn LED indicator light 30 will illuminate intermittently to indicate that the user must turn to the left. When orientation with Qibla is achieved, the central alignment indicator light 32 is illuminated steadily and the turn indicator lights 28, 30 are extinguished. At this point, the user knows that he or she has reached Qibla, i.e., is aligned with the directional path toward Mecca and the Kaaba.

Figure 4:
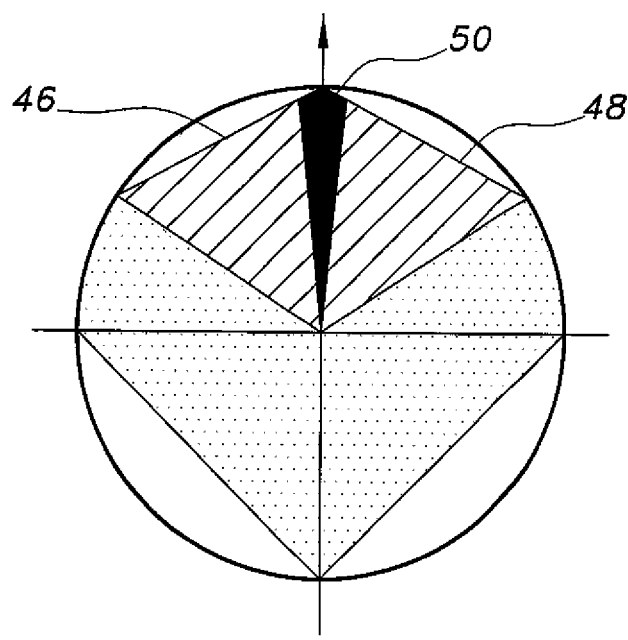
FIG. 4 is a diagrammatic top plan view illustrating the visual signal of the Qibla orientation device according to the present invention.

FIG. 4 provides a schematic plan view of the orientation of the device 10 relative to the direction to Mecca and the Kaaba. The left and right forward segments 46 and 48 extend respectively from about 60 degrees to the left and right of the longitudinal axis, to a very few degrees (about one or two degrees) from the longitudinal axis. A very narrow central segment 50 of perhaps about two degrees width, more or less, lies between the left and right forward segments 46 and 48. If the device 10 is oriented so that the direction to Mecca and the Kaaba extends through either of these left and right segments 46 or 48, then the appropriate light (left light 30 or right light 28, in the elevation view of FIG. 2) will flash. As the user continues to rotate his or her body in the direction indicated with the device 10 suspended from his or her neck, eventually the center light 32 will illuminate and the previously flashing left or right light 30 or 28 will extinguish. At this point, the user knows that he or she is very closely aligned with Mecca and the Kaaba, along the direction aligned through the narrow central segment 50.

Figure 5:
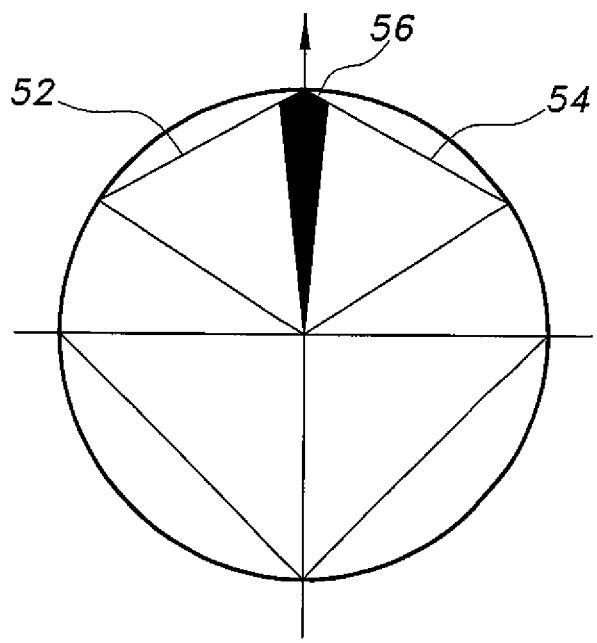
FIG. 5 is a diagrammatic representation of the audio output of the Qibla orientation device according to the present invention.

FIG. 5 is a similar representation to the angular fields represented visually in FIG. 4, but represents the audio operation of the device 10. The representation of FIG. 5 shows relatively large left and right segments, respectively 52 and 54, extending perhaps 60 degrees to either side of a relatively narrow central forward segment 56. If the Qibla orientation device 10 is oriented such that a line from the center of the device to Mecca and the Kaaba is aligned through the left segment 52, then a first tone will sound intermittently. If the device is aligned such that the line to Mecca passes through the right segment 54, then a different tone will sound. When the device 10 is turned to align with Mecca and the Kaaba, i.e., the line passes through the narrow central forward segment 56, a steady tone will sound. Alternatively, the device may be programmed with a voice chip to announce a left or right orientation, or the device may be equipped with a stereo headphone receptacle to allow the user to readily differentiate tones to the left and right.

Figure 6:
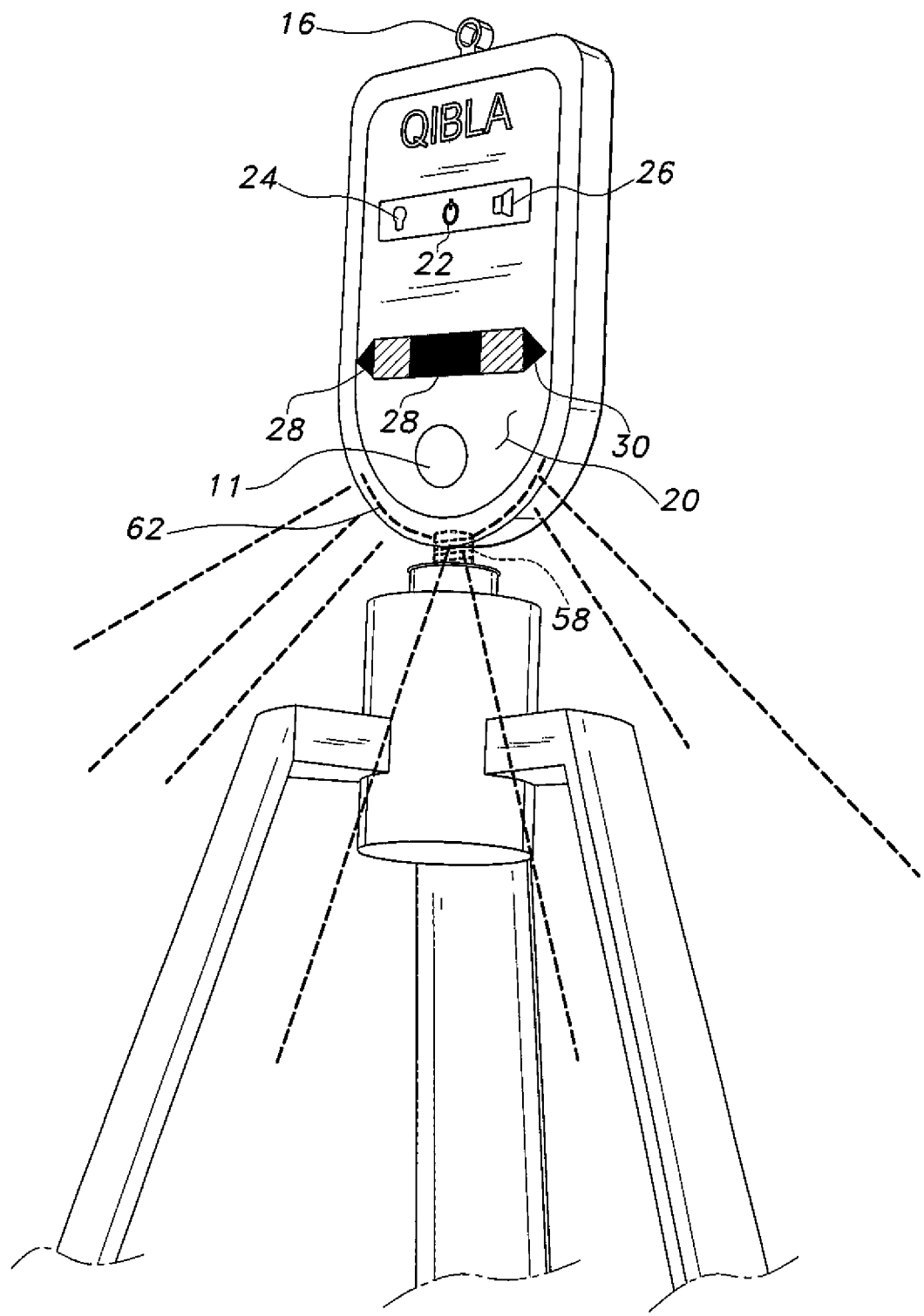
FIG. 6 is a bottom perspective view of the Qibla orientation device according to the present invention, mounted atop a tripod for use.

FIG. 6 is a perspective view showing the Qibla orientation device 10 mounted on a tripod T with the laser projection in operation. The case 14 of the device 10 includes a threaded receptacle or socket 58 in the lower end thereof, allowing the standard threaded stud of a tripod T to be installed therein.

The laser projector may be selectively activated, or may be set to activate when the device 10 is substantially aligned with Qibla, as described further above in the discussion of FIGS. 4 and 5. The laser projector 62 is a semi-circle from which the laser is projected, which, in turn, forms a straight laser line on the surface opposite the projector, i.e., a laser having a lens projecting the laser beam in a plane to appear as a thin line upon a surface. The laser projector 62 is aligned with the longitudinal axis L of the device 10 and is oriented to project a line on the surface below the device 10. The longitudinal axis L also represents the plane of laser light projected by the laser 62, with the very thin or narrow plane defining a thin line of laser light below the lower surface 60 of the case 14 of the device 10, extending from front to back on the ground below the device. Alternatively, the laser projector 62 may be equipped with optics that project a crosshair on the surface below the device 10, if desired. Such line lasers are conventional, and need not be described further. Thus, the device 10 may be mounted on a tripod as shown in FIG. 6 and used to determine Qibla for the initial alignment of a mosque or other building structure, as desired. The projected laser line also assists others who may not have such a Qibla orientation device to align themselves according to Qibla by aligning themselves parallel to the laser line projected by the longitudinal laser 62.

It is to be understood that the present invention is not limited to the embodiments described above, but encompasses any and all embodiments within the scope of the following claims.

I claim:

1. A Qibla orientation device, comprising:
   a small case adapted for suspension from the neck of a user, the case having an upper surface, a lower surface opposite the upper surface, and a forward end;
   a central processing unit (CPU) disposed within the case, the CPU having geographical coordinates for the Kaaba in Mecca stored therein;
   a GPS receiver disposed inside the case, the GPS receiver communicating geographical coordinates of a current or last known location of the case to the CPU;
   a magnetic direction sensor disposed within the case, the magnetic direction sensor communicating the direction the forward end of the case is facing to the CPU;
   a left turn indicator light disposed upon the upper surface of the case, the CPU being programmed to turn the left turn indicator light on when the coordinates of the Kaaba in Mecca are in a direction to the left of the direction communicated by the magnetic direction sensor;
   a right turn indicator light disposed upon the upper surface of the case, the CPU being programmed to turn the right turn indicator light on when the coordinates of the Kaaba in Mecca are in a direction to the right of the direction communicated by the magnetic direction sensor; and
   an alignment indicator light disposed upon the upper surface of the case between the left turn indicator light and the right turn indicator light, the CPU being programmed to turn the alignment indicator light on when the coordinates of the Kaaba in Mecca are within a tolerance zone of the direction communicated by the magnetic direction sensor.

2. The Qibla orientation device according to claim 1, further comprising an audio output device disposed within the case, the CPU being programmed to command the audio output device to produce a first audio signal when the coordinates of the Kaaba in Mecca are in a direction to the left of the direction communicated by the magnetic direction sensor, to produce a second audio signal when the coordinates of the Kaaba in Mecca are in a direction to the right of the direction communicated by the magnetic direction sensor, and to produce a third audio signal when the coordinates of the Kaaba in Mecca are within a tolerance zone of the direction communicated by the magnetic direction sensor.

3. The Qibla orientation device according to claim 1, further comprising a line laser disposed in the case, the line laser being oriented to project a line upon a surface below the lower surface of the case.

4. The Qibla orientation device according to claim 1, wherein said line laser is connected to said CPU, said CPU being programmed to prevent said line laser from projecting the line unless the coordinates of the Kaaba in Mecca are within a tolerance zone of the direction communicated by the magnetic direction sensor.

5. The Qibla orientation device according to claim 1, wherein the magnetic direction sensor is a digital electronic compass having magnetic tilt compensation.

6. The Qibla orientation device according to claim 1, further comprising a lanyard attachment eye extending from the case.

7. The Qibla orientation device according to claim 1, wherein the case includes a tripod attachment socket disposed therein.

8. The Qibla orientation device according to claim 1, wherein the tolerance zone comprises plus or minus 1°.

9. The Qibla orientation device according to claim 1, wherein said indicator lights comprise light emitting diodes.

* * * * *